(12) United States Patent
Jotz et al.

(10) Patent No.: US 10,836,140 B2
(45) Date of Patent: Nov. 17, 2020

(54) COMPOSITE INCLUDING A COMPONENT AND A GLASS MATERIAL

(71) Applicant: Schott AG, Mainz (DE)

(72) Inventors: Matthias Jotz, Mainz (DE); Marten Walther, Alfeld (DE); Florian Resch, Mainz (DE); Thomas Wiegel, Alfeld (DE)

(73) Assignee: Schott AG, Mainz (DE)

( * ) Notice: Subject to any disclaimer, the term of this patent is extended or adjusted under 35 U.S.C. 154(b) by 254 days.

(21) Appl. No.: 16/014,627

(22) Filed: Jun. 21, 2018

(65) Prior Publication Data
US 2018/0370193 A1 Dec. 27, 2018

(30) Foreign Application Priority Data

Jun. 22, 2017 (DE) .................. 10 2017 210 509
Jun. 14, 2018 (DE) .................. 10 2018 209 589

(51) Int. Cl.
*B32B 15/04* (2006.01)
*B32B 17/06* (2006.01)
(Continued)

(52) U.S. Cl.
CPC ........ *B32B 17/10036* (2013.01); *B32B 18/00* (2013.01); *C04B 37/001* (2013.01); *B32B 2457/08* (2013.01); *C03C 3/083* (2013.01); *C03C 3/087* (2013.01); *C03C 3/091* (2013.01); *C04B 2235/9607* (2013.01); *C04B 2237/30* (2013.01); *C04B 2237/34* (2013.01); *C04B 2237/341* (2013.01); *C04B 2237/343* (2013.01);
(Continued)

(58) Field of Classification Search
USPC .................. 428/426, 428, 432, 688
See application file for complete search history.

(56) References Cited

U.S. PATENT DOCUMENTS

| | | | | |
|---|---|---|---|---|
| 2003/0060020 A1* | 3/2003 | Walitzki | ............... | H01L 21/302 |
| | | | | 438/455 |
| 2010/0112782 A1* | 5/2010 | Teixeira | ............... | H01L 21/78 |
| | | | | 438/458 |

(Continued)

FOREIGN PATENT DOCUMENTS

| DE | 39 31 213 A1 | 4/1991 |
|---|---|---|
| EP | 2 912 681 B1 | 10/2016 |

OTHER PUBLICATIONS

Schott, "Ultra-Thin Glass for Electronics Applications", Nov. 15, 2015, Firmenschrift. www.schott.com/advanced_optics/english/download/index.html. (2 pages).

(Continued)

*Primary Examiner* — Lauren R Colgan
(74) *Attorney, Agent, or Firm* — Taylor IP, P.C.

(57) ABSTRACT

A composite includes a component and a glass or glass ceramic material. The component has a first coefficient of expansion $\alpha_1$ and the glass or the glass ceramic material has a second coefficient of expansion $\alpha_2$. The glass or the glass ceramic material has a surface with a thickness and thickness differences (TTV) within the surface, and thickness fluctuations (LTV). The composite has a residual stress in the glass or the glass ceramic material (WARP), and a geometric and material-physical degree of compatibility KG≥4.

24 Claims, 1 Drawing Sheet

(51) Int. Cl.
  *B32B 17/10* (2006.01)
  *B32B 18/00* (2006.01)
  *C04B 37/00* (2006.01)
  *C03C 3/091* (2006.01)
  *C03C 3/083* (2006.01)
  *C03C 3/087* (2006.01)

(52) U.S. Cl.
  CPC .... *C04B 2237/345* (2013.01); *C04B 2237/36* (2013.01); *C04B 2237/365* (2013.01); *C04B 2237/52* (2013.01); *C04B 2237/66* (2013.01); *C04B 2237/704* (2013.01)

(56) References Cited

U.S. PATENT DOCUMENTS

| | | | |
|---|---|---|---|
| 2012/0045611 A1* | 2/2012 | Shih | B32B 17/10 428/137 |
| 2012/0302063 A1* | 11/2012 | Markham | H01L 21/30604 438/692 |
| 2014/0117380 A1* | 5/2014 | Loboda | H01L 21/02008 257/77 |
| 2018/0370193 A1* | 12/2018 | Jotz | C04B 37/001 |

OTHER PUBLICATIONS

Schott, "AF 32 Thin Glass", May 2013, Firmenschrift. www.schott.com/advanced_optics/english/download/index.html. (1 page).

* cited by examiner

COMPOSITE INCLUDING A COMPONENT AND A GLASS MATERIAL

BACKGROUND OF THE INVENTION

1. Field of the Invention

The invention relates to a composite including a component and a glass material, and more particularly to a glass or glass ceramic material.

2. Description of the Related Art

Composites of this type are used in particular in the electronics industry. In this industrial sector it is customary to combine one component, especially a wafer, for example one consisting of silicon or lithium tantalite or other base materials with a glass or glass ceramic material to form a composite. The composite consisting of the wafer material and a glass or glass ceramic material which can also be used as a capping wafer, is produced by means of an adhesive. A capping wafer serves as a cover of the functional layer of a composite beneath it. The functional layer herein may also be in the form of a wafer. After the combining process, the composite is separated into numerous individual components. In order to combine the glass or respectively glass ceramic material with the base material, the glass or respectively the glass ceramic material, in particular the glass wafer is held by suction and smoothed out by an appropriate device. Subsequently the glass or respectively the glass ceramic material or respectively the CAPPING wafer consisting of these materials are wetted with a thin adhesive layer and pressed onto the base materials, in particular onto the component wafer. It is also conceivable that the base material is provided with an adhesive and that the capping wafer is pressed onto the base material. In this combining process, stresses occur in the glass which could remain permanently in the glass due to the adhesion process. An additional problem exists in that the components bend and can in particular sag due to temperature differences. After the component has been bonded with the glass or glass ceramic material, the composite is separated into individual components. This separation into individual components is also referred to as DICING process. In this DICING process, wafers are separated into device size. Thus, from an 8" (20.32 cm) wafer, 2000 components or more can for example be obtained.

The separation into individual components can occur in various separation processes. One option is separation with the assistance of a parting-off grinder which includes a very rapidly rotating disc, whereby separation of the individual components is achieved through appropriate material removal. Alternatively, it is also possible to realize separation with the assistance of a laser. During separation into individual components micro-cracks occur in the glass which can cause the component to fail.

An additional disadvantage of such a composite according to the current state of the art consists in that the coefficient of expansion $\alpha_1$ of the material for the component is selected to be lower than the coefficient of expansion $\alpha_2$ for the glass or respectively the glass ceramic material. In the current state of the art, the coefficient of expansion of the component material is oftentimes only slightly below or equal to the coefficient of expansion of the glass or respectively the glass ceramic material. This however has the disadvantage that tensile stress, which occurs on the underside of the glass or respectively the glass ceramic material, leads to failure of the composite.

An additional disadvantage of such a composite according to the current state is that due to surface unevenness on the surface of the adhesive side of the glass or respectively the glass ceramic material, a relatively thin adhesive layer cannot be applied to the entire surface, and thus tensile stress that occurs on the surfaces of the glass that are not covered with adhesive leads to stress crack corrosion and long-range failure of the composite.

A method for production of a SIC semiconductor wafer has become known from EP 2912681B1, wherein the wafer has a local thickness variation (LTV) of 0.1 to 1.5 µm and a SFQR-value (side-front-side least squares focal plane range) of 0.01 to 0.3 µm. The combination of the SIC semiconductor known from EP 2912681B1 with a substrate and the creation of a composite is not described in EP 2912691B1.

DE 3931213A1 describes a method and a device for interferometric measurement of the evenness of both surfaces of semiconductors with minimal roughness.

Moreover, the use of ultra-thin glass for electronic applications has become known from "SCHOTT: Ultra-Thin glass for electronics application," version November 2015, company publication, www.schott.com/advanced_optics/english/download/index/html and "SCHOTT: AF 32 Thin Glass," May 2013, company publication, www.schott.com/advanced_opticfs/english/download/index.html/.

A disadvantage of using the thin glass that has become known from the above referenced publications in composites was, that the adhesive was not sufficient to hold the components in the composite. Moreover, tensile stresses formed in the composite that could lead to breakage of the glass used in the composite.

If a thin glass or respectively a glass wafer according to the current state of the art is used as the glass material for a composite, then the following occurs in glasses available on today's market:

WARP of 200 µm

TTV of 15 µm

LTV of 0.6 µm

In regard to the definition of the terms WARP, TTV and LTV we refer you to the current definitions as defined for example on website http://global-sei.com/sc/products_e/inp/flat.html of Sumitomo Electric.

The TTV (Total Thickness Variation) is understood to be the difference between the highest and the lowest protrusion on the surface of a substrate relative to its sides.

LTV is the difference between the highest point and the lowest point within one side of the surface of a substrate.

The WARP is the difference between the highest point above and the lowest point below a referenced plane of a substrate.

With an $\alpha_1$ of $12 \cdot 10^{-6}$ 1/K for a piezo substrate consisting of lithium niobate and $\alpha_2$ of $3.2 \cdot 10^{-6}$ 1/K for an alkali free alumino borosilicate glass AF32 the following applies for the compatibility degree KG:

$$KG = -20.25$$

This degree of compatibility of −20.25 is clearly less than 4. The glasses according to the current state of the art are therefore not suitable for the creation of a stable composition.

Even appropriate glasses with a WARP of 160 μm and a TTV of 12 μm still result in a KG of 3.4 and are eliminated for a stable composition.

What is needed in the art is a composite that avoids the disadvantages of the current state of the art and that is characterized in particular by its high durability.

SUMMARY OF THE INVENTION

In accordance with an embodiment of the present invention, a composite includes a component and a glass or glass ceramic material. The component has a first coefficient of expansion $\alpha_1$ and the glass or the glass ceramic material has a second coefficient of expansion $\alpha_2$. The glass or the glass ceramic material has a surface with a thickness and thickness differences (TTV) within the surface, thickness fluctuations (LTV), and a residual stress (WARP). The composite including the component and the glass or glass ceramic material has a residual stress in the glass or the glass ceramic material (WARP), and a geometric and material-physical degree of compatibility $$KG=10\cdot(\alpha_1/\alpha_2)\cdot((1-(LTV/1.5))+(1-(TTV/7))+(1-(WARP/200))), \text{ wherein } KG \geq 4.$$

In accordance with another embodiment of the invention, a method provides producing a composite including a component and a glass or glass ceramic material. The component has a first coefficient of expansion $\alpha_1$ and the glass or glass ceramic has a second coefficient of expansion $\alpha_2$. The glass or the glass ceramic material has a surface with a thickness and thickness differences (TTV) within the surface, thickness fluctuations (LTV), and a residual stress (WARP). The composite including the component and the glass or glass ceramic material has a residual stress in the glass or the glass ceramic material (WARP) and a geometric and material-physical degree of compatibility $KG=10\cdot(\alpha_1/\alpha_2)\cdot((1-(LTV/1.5))+(1-(TTV/7))+(1-(WARP/200)))$, wherein $KG \geq 4$. The method includes providing the component having the first coefficient of expansion $\alpha_1$ and the glass or glass ceramic material having the second coefficient of expansion $\alpha_2$, stretching to smooth the glass or glass ceramic material, wetting at least one of the surface of the component and the glass or glass ceramic material with a thin layer of a bonding material, and pressing the component and the glass or glass ceramic material to form the composite.

According to an embodiment of the invention, a composite has a degree of compatibility $$KG=10\cdot(\alpha_1/\alpha_2)\cdot((1-(LTV/1.5))+(1-(TTV/7))+(1-(WARP/200))),$$

whereby $KG \geq 4$, in particular $\geq 15$, preferably $\geq 30$.

LTV, TTV and WARP are herein specific values of the glass substrate. TTV describes the thickness variation inside the glass substrate. LTV describes the local thickness fluctuation that is characteristic for the surface quality on a surface and WARP describes the deflection of the glass substrate. The reason for the WARP are production related residual tensions in the glass. The degree of compatibility is thus determined essentially by the glass properties.

Composites that are characterized by such a degree of compatibility, surprisingly offer a longer lifespan compared to conventional composites as well as a high degree of compatibility of the materials. Moreover, they have low residual stresses in the glass and a high surface quality.

These composites are moreover characterized by highly optimized adhesion of the component on the glass substrate by means of an adhesive, wherein the adhesive oftentimes is only 10 μm. The inventive selection ensures an application of adhesive that is as uniform as possible and extends across the entire surface, enabling reliable adhesion even with minimal adhesive thickness. Based on the predominantly uniform thickness as well as application of the adhesive over the entire surface, uneven shrinkage of the adhesive is avoided in the production process. Thus, no improper inhomogeneous transfer of tensile stresses to the glass occurs which could cause detachment of the adhesive bond.

Composites that achieve the cited degree of compatibility represent an inventive selection from a multitude of glass qualities in regard to WARP, TTV, LTV and the coefficient of expansion.

According to an embodiment of the invention the unexpectedly found interaction between the two coefficients of expansion of component (component wafer) and glass substrate (glass wafer), the LTV, TTV and the WARP of the glass substrate lead to the unforeseeable results. These composites are characterized by a low tension at high surface quality and good adhesion of components on the glass substrate.

In order to avoid a break in the glass due to the stress that occurs during the bonding process it is preferred if, in contrast to the current state of the art, the coefficient of expansion $\alpha_1$ of the component (component wafer) is always greater than the coefficient of expansion $\alpha_2$ for the glass or the glass ceramic material (glass wafer). If $\alpha_1$ is greater than $\alpha_2$ a tensile stress on the adhesive side of the glass or respectively the glass ceramic material is determined, wherein adhesion over the entire surface with homogeneous adhesive thickness counteracts crack formation or crack propagation in the glass or respectively the glass ceramic material. Due to the shift of the stress zero line in the composite, the tensile stresses are clearly reduced and thus the lifespan of the glass is clearly extended. With such an option, the compressive stress on the side opposite the adhesive side of the glass does not reduce the lifespan. However, there is an upper limit in this option. It must be ensured that the coefficient of expansion $\alpha_1$ of the component does not exceed triple the coefficient of expansion $\alpha_2$ of the glass or respectively the glass ceramic material. The reason for this is that with a greater coefficient of expansion $\alpha_1$—at a change in temperature—the size of the component changes considerably more than that of the glass or respectively glass material. This then causes tensile stresses on the bonded side of the glass or respectively glass ceramic material which then—in spite of the strengthening adhesive lead to failure of the bond. The first coefficient of expansion $\alpha_1$ of the component is at a maximum triple that of the second coefficient of expansion $\alpha_2$ of the glass or the glass ceramic material.

If due to a lower coefficient of expansion of the component wafer in contrast to the second coefficient of expansion of the glass material, tensile stresses would occur on the side of the glass opposite the adhesive side, then the glass material would fail early on.

In one embodiment, the adhesive wets the surface entirely. With a completely moistened surface, the tensile stress in the composite decreases, so that stress crack corrosion is avoided. Moreover, the adhesive keeps water away from the crack tip, thus slowing down or completely avoiding stress crack corrosion.

In another embodiment, the difference in thickness (TTV) of the glass or glass ceramic material inside the surface is <10 μm, preferably <7 μm. Such a value provides high compatibility between component and glass or respectively glass ceramic material. This is due to the fact that the thickness of the adhesive layer for bonding of component and glass material is generally <10 μm. With a thickness of <10 μm the adhesive layer is too thin for it to be possible to compensate greater unevenness between two layers.

The TTV (Total Thickness Variation) describes that the glass substrate beneath a component has an unequal thickness. For example, a small wave or bulge could occur at the bonding location. The adhesive would have to compensate for this unevenness and would have to be applied in uneven thickness. Because of the very thin adhesive layers at thicknesses of <10 μm, a TTV that is as insignificant as possible is advantageous and leads to high compatibility between component (component wafer) and glass (glass wafer). The TTV is generally less than 10 μm, 8 μm, 7 μm, 6 μm, 5 μm 4 μm, 3 μm, 2 μm.

A further developed embodiment provides that the surface quality that is characterized by the local thickness fluctuation (LTV) of the glass or glass ceramic material over a surface of 25 mm² or less is <5 μm, preferably <2 μm. The reason for this is that such a surface quality provides especially good adhesion of the bonding material, in particular the adhesive that is provided to bond the glass or glass ceramic material. If the LTV is too great, the roughness of the surface will lead to poor adhesion of the bonding material, in particular the adhesive, since the adhesive cannot compensate for changes in the layer thickness. The LTV characterizes the "edge steepness" of the surface roughness which—in the case of unfavorable angle conditions—leads to poor adhesion of the adhesive. As a rule, the LTV is ≤5 μm, ≤2 μm, ≤1.0 μm, ≤0.8 μm, ≤0.6 μm, ≤0.5 μm, ≤0.4 μm, ≤0.3 μm, ≤0.2 μm, ≤0.1 μm.

A further developed embodiment provides that the (WARP) of the glass or glass ceramic material is <300 μm, preferably <200 μm for a composite component, for example a capping wafer having a diameter of for example 6" (15.24 cm). The WARP describes a deflection of the glass-/glass ceramic wafers due to residual stresses from the production process in the glass substrate. Since the glass or respectively the glass ceramic material is smoothed out in every bonding process, additional stresses occur in the material during the smoothing process, depending on the WARP and remain there so that the composite consisting of component and glass or glass ceramic material exhibits residual stress. In order to keep such stresses on the adhesive side of the composite as low as possible it is necessary that the WARP in the glass or glass ceramic material does not exceed a value of ≤300 μm, preferably ≤200 μm, in particular ≤150 μm, ≤120 μm, ≤100 μm, ≤80 μm, ≤60 μm, ≤40 μm, ≤20 μm. Surprisingly, detachment of the adhesive layer from the glass substrate surface and/or too high stresses resulting due to bonding with the glass substrate are avoided with a low WARP if the conditions of the compatibility degree are adhered to according to embodiments of the invention.

The materials used for the component, in particular the electronic component, preferably the wafer, are silicon or lithium tantalate. Other materials are lithium niobate, lithium tetraborate, glass, ceramic, silicon carbide, gallium nitrite, gallium arsenide, indium phosphide, sapphire, quartz.

In embodiments of the invention, the preferred glass material is soda lime glass or borosilicate glass, or also an alkali free glass, alkali free alumino borosilicate glass or aluminosilicate glass, B270 glass, D263 glass, AS87 glass, MEMpax glass or AF32 glass by Schott AG, Mainz.

Below, the glass composite ranges are specified for the aforementioned glasses.

The composition of the glass identified as the MEMpax glass results for example from the following composition in weight-%:

| Composition | (Weight-%) |
|---|---|
| SiO2 | 63-85 |
| Al2O3 | 0-10 |
| B2O3 | 5-20 |
| Li2O + Na2O + K2O | 2-14 |
| MgO + CaO + SrO + BaO + ZnO | 0-12 |
| TiO2 + ZrO2 | 0-5 |
| P2O5 | 0-2 |

Coloring oxides can possibly be added, such as Nd2O3, Fe2O3, CoO, NiO, V2O5, MnO2, TiO2, CuO, CeO2, Cr2O3, 0-2 weight-%, As2O3, Sb2O3, SnO2, SO3, Cl, F and/or CeO2 can be added as refining agents and the overall amount of the total composition is 100%.

The composition of the glass identified as the D263 glass results for example from the following composition in weight-%:

| Composition | (Weight-%) |
|---|---|
| SiO2 | 60-84 |
| Al2O3 | 0-10 |
| B2O3 | 3-18 |
| Li2O + Na2O + K2O | 5-20 |
| MgO + CaO + SrO + BaO + ZnO | 0-15 |
| TiO2 + ZrO2 | 0-4 |
| P2O5 | 0-2 |

Coloring oxides can possibly be added, such as Nd2O3, Fe2O3, CoO, NiO, V2O5, MnO2, TiO2, CuO, CeO2, Cr2O3, 0-2 weight-%, As2O3, Sb2O3, SnO2, SO3, Cl, F and/or CeO2 can be added as refining agents and the overall amount of the total composition is 100%.

The composition of the glass identified as the AF32 glass results for example from the following composition in weight-%:

| Composition | (Weight-%) |
|---|---|
| SiO2 | 58-65 |
| Al2O3 | 14-25 |
| B2O3 | 6-10.5 |
| MgO + CaO + SrO + BaO + ZnO | 8-18 |
| ZnO | 0-2 |

Coloring oxides can possibly be added, such as Nd2O3, Fe2O3, CoO, NiO, V2O5, MnO2, TiO2, CuO, CeO2, Cr2O3, 0-2 weight-%, As2O3, Sb2O3, SnO2, SO3, Cl, F and/or CeO2 can be added as refining agents and the overall amount of the total composition is 100%.

The composition of the glass identified as the B270 glass results for example from the following composition in weight-%:

| Composition | (Weight-%) |
|---|---|
| SiO2 | 50-81 |
| Al2O3 | 0-5 |
| B2O3 | 0-5 |
| Li2O + Na2O + K2O | 5-28 |
| MgO + CaO + SrO + BaO + ZnO | 5-25 |
| TiO2 + ZrO2 | 0-6 |
| P2O5 | 0-2 |

Coloring oxides can possibly be added, such as Nd2O3, Fe2O3, CoO, NiO, V2O5, MnO2, TiO2, CuO, CeO2, Cr2O3, 0-2 weight-%, As2O3, Sb2O3, SnO2, SO3, Cl, F and/or CeO2 can be added as refining agents and the overall amount of the total composition is 100%.

The composition of the glass identified as the AS87 glass results for example from the following composition in weight-%:

| | |
|---|---|
| SiO2 | 52-66 |
| B2O3 | 0-8 |
| Al2O3 | 15-25 |
| MgO + CaO + SrO + BaO + ZnO | 0-6 |
| $ZrO_2$ | 0-2.5 |
| Li2O + Na2O + K2O | 4-30 |
| TiO2 + CeO2 | 0-2.5 |

Coloring oxides can possibly be added, such as Nd2O3, Fe2O3, CoO, NiO, V2O5, MnO2, CuO, Cr2O3, 0-2 weight-%, As2O3, Sb2O3, SnO2, SO3, Cl, F and/or CeO2 can as be added as refining agents and the overall amount of the total composition is 100%.

The glass material in the embodiment of a glass- or glass ceramic sheet has preferably a thickness of less than 700 μm, preferably in the range of 600 to 700 μm. Especially preferred are thin glass sheets with a thickness that is especially in the range of ≤300 μm, preferably ≤150 μm, ≤100 μm, ≤70 μm, especially <50 μm, ≤30 μm.

A bonding material, in particular an adhesive material used in the inventive composites is for example an adhesive that is curable with UV radiation. UV curing is however not absolutely necessary. Composites can also be produced by means of anodic bonding, other curable adhesives, etc.

The glass or glass ceramic and/or the component itself can comprise structures and holes. Such an arrangement permits feedthrough through the glass. The feedthrough through the glass or the glass ceramic allows for the packing density of the entire component to be reduced.

In addition to the component itself, an embodiment of the invention also provides a method to produce such a component. In such a method the component is initially provided with a coefficient of expansion $\alpha_1$ and the glass or glass ceramic material with a second coefficient of expansion $\alpha_2$. The glass or respectively the glass ceramic material is then stretched smooth, for example by means of suction. After the glass or respectively the glass ceramic material has been smoothed, the glass or respectively the glass ceramic material and the component each are wetted with a thin layer of the bonding material, in particular an adhesive. After application of the bonding material, in particular the adhesive, the glass or respectively the glass ceramic material is then pressed onto the component, for example onto the silicon wafer, resulting in the composite according to the invention. It is especially preferred if the thin adhesive layer covers and/or wets the entire surface of the glass substrate as well as the component with homogeneous application thickness. According to the invention this is ensured if the specified degree of compatibility KG which is essentially determined by the glass or glass ceramic properties is adhered to. After the composite has been produced it can be separated into individual components, for example in a DICING method.

The composite according to embodiments of the invention is used in particular in passive or active components such as integrated optics, optical parametric oscillators, electro-optical quality switches, sensors, frequency converters, frequency filters and applications with acoustic surface waves.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
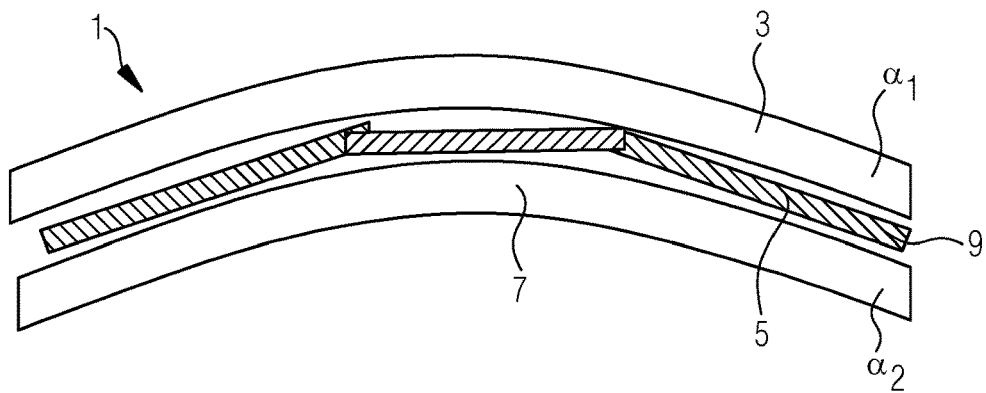
FIG. 1 is a composite according to the current state of the art, which leads to stress crack corrosion.

FIG. 1 illustrates a composite according to the current state of the art. Composite 1 according to the current state of the art consists of a component 3 that is bonded together by means of an adhesive 5 with a glass 7 or a glass ceramic material 7. Adhesive 5 is inserted as an intermediate layer 9 between component 3 and glass 7. The thermal coefficient of expansion of component 3 is $\alpha_1$, the thermal coefficient of expansion of the glass substrate is $\alpha_2$. As is seen in FIG. 1, a coefficient of expansion $\alpha_1$ of the material of the component that is lower than the coefficient of expansion $\alpha_2$ of the glass substrate leads to a tensile stress occurring on the surface of the glass that is not wetted with adhesive, resulting in stress crack corrosion and long-range failure of the composite. The example in FIG. 1 clearly illustrates that adhesive 5 does not cover the entire surface of the glass or glass ceramic material which is also the case regarding the surface of the component. Accordingly, a bond of this type is not stable.

Figure 2A:
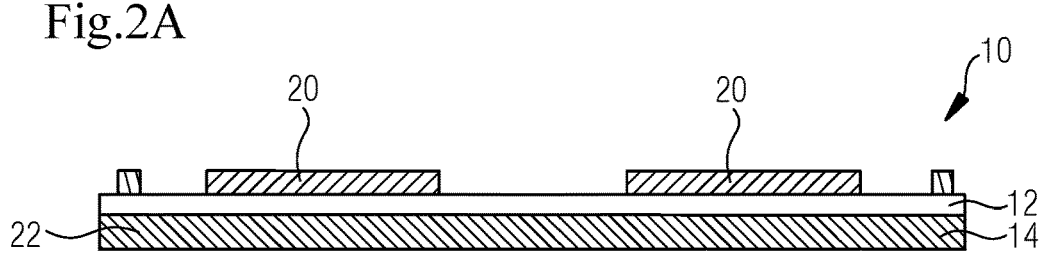
FIG. 2A is a side view of a composite, according to an embodiment of the invention.
Figure 2B:
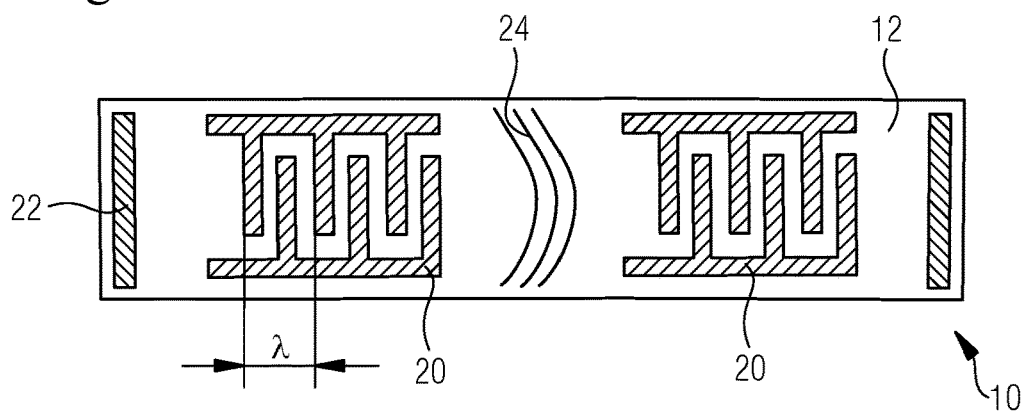
FIG. 2B is a top-view of the composite of FIG. 2A, according to an embodiment of the invention.

FIGS. 2A and 2B illustrate a composite 10 according to an embodiment of the invention, including a component 12, in particular an electronic substrate and a glass substrate 14. FIG. 2A shows a side view of the composite and FIG. 2B illustrates a top view. Component 12 in the illustrated example is a piezo substrate comprising an input structure 20 that can also serve as output structure. As material for the piezo substrate, lithium niobate is predominantly used that has a thermal coefficient of expansion $\alpha=12\cdot10^{-6}$ 1/K. In addition to input/output structure 20 the piezo substrate also shows an absorber 22. The piezo substrate serves to convert electronic GHz signals in input structure 20 into surface waves that enable a compact filter design. The surface wave spreading across the substrate is identified with 24. An AF32 glass having a thickness of 0.3 mm can be used as the glass substrate. AF32 glass is an alkali free alumino-borosilicate thin glass by Schott AG, Mainz. Alumino-borosilicate glass AF32 is characterized by excellent electric properties and a low thermal coefficient of expansion of $3.2 \cdot 10^{-6}$ 1/K. The surface roughness is <1 nm RMS, the electric constant ε at 1 MHz is 5.1, the refractive index $n_D$ is 1.5099 and the density after annealing at 40° C./h is 2.43 g/cm³.

The geometric and material-physical degree of compatibility $$KG=10 \cdot (\alpha_1/\alpha_2) \cdot ((1-(LTV/1.5))+(1-(TTV/7))+(1-(WARP/200)))$$

of the exemplary embodiment according to FIGS. 2A to 2B, with a value for the thickness difference TTV of 5 μm, the thickness fluctuation LTV of 0.6 μm and a WARP value of 130 μm, as well as the stated values of $\alpha_1$ for the electronic substrate and $\alpha_2$ for the glass material, is

KG=46.12 which is greater than KG=15 and 30.

Instead of the borosilicate glass AF32, a modified soda-lime glass, for example B270 can also be used.

In the inventive design example according to FIGS. 2a and 2b the adhesive layer that is located between component surface and glass or glass ceramic surface is placed uniformly and with homogenous thickness on the surfaces due to the degree of compatibility KG>4, in contrast to the adhesive layer illustrated in FIG. 1 which, due to tensile stresses and unfavorable surface geometry does not display a surface that is completely covered with adhesive.

Furthermore, design examples according to embodiments of the invention are provided.

In a first design example the material used for the component in one exemplary embodiment is again lithium niobate with an $\alpha_1$ of approximately $12 \cdot 10^{-6}$ 1/K. The glass material used is for example a special glass B270 by Schott AG, Hattenbergstrasse 10, 55120 Mainz with appropriately selected properties for LTV, TTV and WARP. Glass material B270 is a highly transparent modified soda lime glass. The coefficient of expansion of B270 is $\alpha_2=9.4 \cdot 10^{-6}$ 1/K. Glass B270 has a difference in thickness TTV in the selected design example of TTV=5 μm. The fluctuation in thickness LTV of the glass is LTV=0.6 μm. The WARP of the glass used in the design example described above is 130 μm. The design example including lithium niobate in combination with B270 glass then has a $$KG = 10 \cdot \left( \frac{12 \cdot 10E - 61/K}{9{,}4 \cdot 10E - 61/K} \right) \cdot$$
$$\left[ \left(1 - \frac{0{,}6\,\mu m.}{1{,}5\,\mu m.}\right) + \left(1 - \frac{5\,\mu m.}{7\,\mu m.}\right) + \left(1 - \frac{130\,\mu m.}{200\,\mu m.}\right) \right]$$
$$= 15.7$$

and therefore, a KG≥4, in particular ≥15. For a glass B270 with such specifications, a surprisingly stable bond is the result.

Alternatively to glass material B270, other glass materials can also be used, for example glass AF32 by Schott AG, Hattenbergstrasse 10, 55120 Mainz.

The coefficient of expansion $\alpha_2$ of AF32 is $3.2 \cdot 10^{-6}$ 1/K. At the same values for the lithium niobate material and parameters TTV, LTV and WARP the following results $$KG = 10 \cdot \left( \frac{12 \cdot 10E - 61/K}{9{,}4 \cdot 10E - 61/K} \right) \cdot$$
$$\left[ \left(1 - \frac{0{,}6\,\mu m.}{1{,}5\,\mu m.}\right) + \left(1 - \frac{5\,\mu m.}{7\,\mu m.}\right) + \left(1 - \frac{130\,\mu m.}{200\,\mu m.}\right) \right]$$
$$= 46.12,$$

and therefore, a KG≥15, preferably ≥30.

The invention specifies for the first time a composite that, compared to composites that are known from the current state of the art distinguishes itself through longer lifespan of the composite, as well as greater compatibility of the materials. The composites according to the invention moreover are characterized by low residual stresses in the glass and high surface quality.

Furthermore, excellent adhesion of the adhesive is provided in the composite as well as on the surface and also on the component surface.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A composite, comprising:
   a component; and
   a glass material which is a thin glass sheet having a thickness <300 μm , wherein
   the component has a first coefficient of expansion $\alpha_1$, wherein
   the glass material has a second coefficient of expansion $\alpha_2$, wherein
   the glass material has a surface with a thickness and thickness differences (TTV) within the surface, thickness fluctuations (LTV), and a WARP, wherein
   the composite including the component and the glass material has a residual stress in the glass material, and wherein
   the composite has a geometric and material-physical degree of compatibility $$KG=10 \cdot (\alpha_1/\alpha_2) \cdot ((1-(LTV/1.5))+(1-(TTV/7))+(1-(WARP/200))), \text{ wherein } KG \geq 4.$$

2. The composite according to claim 1, wherein KG≥15.

3. The composite according to claim 1, wherein KG≥30.

4. The composite according to claim 1, wherein the component is an electronic component.

5. The composite according to claim 1, wherein the component is a substrate.

6. The composite according to claim 5, wherein the substrate is an electronic substrate.

7. The composite according to claim 1, wherein the component is a wafer.

8. The composite according to claim 1, wherein the first coefficient of expansion $\alpha_1$ of the component is greater than or equal to the second coefficient of expansion $\alpha_2$ of the glass material.

9. The composite according to claim 8, wherein at a maximum, the first coefficient of expansion $\alpha_1$ is triple that of the second coefficient of expansion $\alpha_2$ of the glass material.

10. The composite according to claim 1, wherein the difference in thickness (TTV) of the glass material within the surface is <10 µm.

11. The composite according to claim 1, wherein the difference in thickness (TTV) of the glass material within the surface is <7 µm.

12. The composite according to claim 1, wherein local fluctuations in thickness (LTV) of the glass material over a surface area of 25 mm² or less is <5 µm.

13. The composite according to claim 1, wherein local fluctuations in thickness (LTV) of the glass material over a surface area of 25 mm² or less is <2 µm.

14. The composite according to claim 1, wherein the WARP in the glass material is <300 µm for a composite component with a diameter of 6 inches.

15. The composite according to claim 1, wherein the WARP in the glass material is <200 µm for a composite component with a diameter of 6 inches.

16. The composite according to claim 1, wherein the component comprises one or more materials selected from the group of: silicon, lithium tantalate, lithium niobate, lithium tetraborate, glass, ceramic, silicon carbide, gallium nitrite, gallium arsenide, indium phosphide, sapphire and quartz.

17. The composite according to claim 1, wherein the glass material is a soda-lime glass, a borosilicate glass, or an alkali free alumino borosilicate glass.

18. The composite according to claim 1, wherein the glass sheet is a thin glass sheet having a thickness <200 µm.

19. The composite according to claim 1, wherein the glass sheet is a thin glass sheet having a thickness <50 µm.

20. The composite according to claim 1, wherein the composite comprises a bonding material for bonding of the glass material with the component.

21. The composite according to claim 20, wherein the bonding material is an adhesive material.

22. The composite according to claim 21, wherein the adhesive material can be cured with UV radiation.

23. A method to produce a composite including a component and a glass material, wherein the component has a first coefficient of expansion $\alpha_1$, wherein the glass has a second coefficient of expansion $\alpha_2$, wherein the glass material has a surface with a thickness and thickness differences (TTV) within the surface, thickness fluctuations (LTV), and a WARP, wherein the composite including the component and the glass material has a residual stress in the glass material, and wherein the composite has a geometric and material-physical degree of compatibility $KG=10\cdot(\alpha_1/\alpha_2)\cdot((1-(LTV/1.5))+(1-(TTV/7))+(1-(WARP/200)))$, wherein $KG \geq 4$, wherein the glass material is a thin glass sheet having a thickness <300 µm and wherein said method comprises:

providing the component having the first coefficient of expansion $\alpha_1$ and the glass material having the second coefficient of expansion $\alpha_2$;

stretching to smooth the glass material;

wetting at least one of the surface of the component and the glass material with a thin layer of a bonding material; and pressing the component and the glass material to form the composite.

24. The method according to claim 23, wherein the stretching to smooth the glass material includes using suction.

* * * * *

UNITED STATES PATENT AND TRADEMARK OFFICE
CERTIFICATE OF CORRECTION

| | | |
|---|---|---|
| PATENT NO. | : 10,836,140 B2 | Page 1 of 1 |
| APPLICATION NO. | : 16/014627 | |
| DATED | : November 17, 2020 | |
| INVENTOR(S) | : Jotz et al. | |

It is certified that error appears in the above-identified patent and that said Letters Patent is hereby corrected as shown below:

In the Specification

Column 10

At Line one, please delete "$10 \cdot (\frac{12 \cdot 10E\text{-}6\ 1/K}{9,4 \cdot 10E\text{-}6\ 1/K})$", and substitute therefore, --$10 \cdot (\frac{12 \cdot 10E\text{-}6\ 1/K}{3,2 \cdot 10E\text{-}6\ 1/K})$--.

Signed and Sealed this
First Day of November, 2022

Katherine Kelly Vidal
*Director of the United States Patent and Trademark Office*